(12) United States Patent
Nozaki

(10) Patent No.: US 6,735,520 B2
(45) Date of Patent: May 11, 2004

(54) MAP INFORMATION PROVIDING METHOD, MAP INFORMATION PROVIDING SYSTEM, AND RECORDING MEDIUM ON WHICH THE METHOD PROGRAMED IS RECORDED

(75) Inventor: Takashi Nozaki, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 0 days.

(21) Appl. No.: 09/946,735

(22) Filed: Sep. 6, 2001

(65) Prior Publication Data

US 2002/0133290 A1 Sep. 19, 2002

(30) Foreign Application Priority Data

Mar. 13, 2001 (JP) .................................. 2001-071145

(51) Int. Cl.[7] .............................................. G01C 21/00
(52) U.S. Cl. ................ 701/211; 340/995.1; 340/995.24
(58) Field of Search ................................ 701/200, 201, 701/208, 211; 340/990, 995; 709/203

(56) References Cited

U.S. PATENT DOCUMENTS

| | | | | |
|---|---|---|---|---|
| 5,398,188 A | * | 3/1995 | Maruyama | 701/208 |
| 5,424,951 A | * | 6/1995 | Nobe et al. | 701/200 |
| 5,941,930 A | * | 8/1999 | Morimoto et al. | 701/201 |
| 5,944,769 A | * | 8/1999 | Musk et al. | 701/201 |
| 6,073,075 A | * | 6/2000 | Kondou et al. | 701/203 |
| 6,122,592 A | * | 9/2000 | Arakawa et al. | 701/201 |
| 6,240,360 B1 | * | 5/2001 | Phelan | 701/208 |
| 6,282,493 B1 | * | 8/2001 | Kitagawa et al. | 701/211 |
| 6,314,295 B1 | | 11/2001 | Kawamoto | |
| 6,381,535 B1 | * | 4/2002 | Durocher et al. | 701/202 |
| 6,430,498 B1 | * | 8/2002 | Maruyama et al. | 701/200 |

FOREIGN PATENT DOCUMENTS

| | | |
|---|---|---|
| EP | 0 532 158 A1 | 8/1993 |
| EP | 0 829 704 A2 | 4/1998 |
| JP | 06-147909 * | 5/1994 |

OTHER PUBLICATIONS

Patent Abstracts of Japan vol. 1997, No. 11, Nov. 28, 1997 & JP 09 182143 A (SONY Corp.), Jul. 11, 1997.

* cited by examiner

Primary Examiner—Michael J. Zanelli
(74) Attorney, Agent, or Firm—Sughrue Mion, PLLC

(57) ABSTRACT

A map information providing method, a map information providing system, and a recording medium on which the method programed is recorded is provided, wherein a client terminal unit 3 including a display monitor accesses a map information site (a Web-server 1) through a communication line (the Internet 2). An institution or its related information is inputted, and the Web-server 1 calculates azimuth information consisting of a direction and a distance to the institution from an arbitrary position around a present position, decides a surrounding area to be displayed, and transmits a map of the surrounding area along with the azimuth information to the terminal unit to display them.

21 Claims, 4 Drawing Sheets

LENGTH

THICKNESS OR COLOR
(SAME LENGTH)

MAP INFORMATION PROVIDING METHOD, MAP INFORMATION PROVIDING SYSTEM, AND RECORDING MEDIUM ON WHICH THE METHOD PROGRAMED IS RECORDED

BACKGROUND OF THE INVENTION

1. Field of the Invention

The present invention relates to a map information providing method, a map information providing system, and a recording medium on which the method programed is recorded, for obtaining map information accumulated in a database by using the Internet.

2. Description of the Related Art

Currently, various information is provided from the world through a WWW(World Wide Web) server on the Internet using the Internet protocol. A user can get necessary information by operating a terminal unit connected to the Internet and carrying out a retrieval.

There is a map information retrieval-display service as one of various information services provided through the Internet. The above service has a map database, and by accessing the Web-server connected to the Internet, a necessary map information can be obtained and displayed on the terminal unit. Specifically, when a user inputs an address, a place name, a station name, an institution name, or a store name, a map of the place and its surroundings is displayed on the terminal unit as an image information. Therefore, a user can easily recognize where his destination is by referring to the displayed map information.

Now, the terminal unit for the map information retrieval service on the Internet, a personal computer, a vehicle-mounted navigation system, the PDA (Personal Digital Assistants), or a portable telephone is used. With respect to the above apparatuses, especially a portable telephone with a relatively small display capacity, it is difficult to get information about the displayed surrounding area, and requires very troublesome scroll of the display.

Since such troublesome scroll of the display makes its operability worse, increases telephone charges, and could cause an overload, then a user's ability to obtain map information becomes tedious and disadvantageous.

SUMMARY OF THE INVENTION

In view of the foregoing, an object of the present invention is to provide a map information providing method, a map information providing system, and a recording medium on which the method programmed is recorded, wherein recognition of a surrounding area is facilitated by displaying a direction of, for example, an institution including a station on a map on a display of a client terminal unit in a map information retrieval service system using the Internet, a user's burden is lightened by facilitating the above recognition by using, for example, 8-direction arrows by varying indication depth or color according to the distance, and the operability is improved.

In order to achieve the above object, as a first aspect of the present invention, a map information providing method used for a map information providing system wherein a map information providing server and a terminal unit are connected through a communication line comprises the steps of: inputting an institution or its related information from the terminal unit; calculating azimuth information consisting of a direction and a distance to the institution from an arbitrary position as a central position; specifying a surrounding area to be displayed on the terminal unit; and displaying map information of the surrounding area and the azimuth information on the terminal unit.

Therefore, recognition of information of the surrounding area to a destination is facilitated, and a useless scrolling operation can be omitted at the terminal unit with a small display capacity, thereby lightening the user's burden of the recognition.

As a second aspect of the present invention, a map information providing method used for a map information providing system wherein a map information providing server and a terminal unit are connected through a communication line comprises the steps of: inputting an institution or its related information from the terminal unit; calculating azimuth information consisting of a direction and a distance to the institution from a present position as a central position; specifying a surrounding area to be displayed on the terminal unit; and displaying map information of the surrounding area and the azimuth information on the terminal unit.

Therefore, recognition of information of the surrounding area around the present position positioned by using, e.g., the Global Positioning System, to a destination is facilitated, and a useless scrolling operation can be omitted at the terminal unit with a small display capacity, thereby lightening the user's burden of the recognition.

As a third aspect of the present invention, based on the first or second aspect, the institution is a station being a public institution.

Since a station could be the most general landmark in various institutions for recognizing the surrounding area, displaying a direction of the nearest station on a map enables a user to easily recognize the surrounding area.

As a fourth aspect of the present invention, based on the first or second aspect, the related information is at least one of an address, a place name, and a zip code.

Therefore, the surrounding area can be recognized by either an address, a place name, or a zip code in addition to an institution, the surrounding can be recognized with flexibility in addition to an improvement of the operability.

As a fifth aspect of the present invention, based on the first or second aspect, the information providing method further comprises the steps of: retrieving an institution existing within a predetermined distance from the central position; calculating a direction and a distance from the central position to the institution having been retrieved; and transmitting a result of the calculation as azimuth information to the terminal unit. As a sixth aspect of the present invention, based on the fifth aspect, the azimuth information is designated by a n-azimuth form wherein length of a line segment indicating an azimuth varies according to a distance.

As a seventh aspect of the present invention, based on the fifth aspect, the azimuth information is designated by a n-azimuth form wherein indication depth of a line segment indicating an azimuth varies according to a distance. As an eighth aspect of the present invention, based on the fifth aspect, the azimuth information is designated by a n-azimuth form wherein indication color of a line segment indicating an azimuth varies according to a distance. As a ninth aspect of the present invention, based on the sixth aspect, a name of the institution is shown near the line segment.

Therefore, when a map is displayed the direction of the nearest institution such as a station is shown by a line segment or an arrow symbol, and the visibility is enhanced by carrying out depth indication or color indication, thereby further lightening the user's burden and improving the operability because of avoiding a useless scrolling operation.

As a tenth aspect of the present invention, based on the ninth aspect, the corresponding line segment of the n-azimuth form is not shown when the distance from the central position to the institution exceeds the predetermined distance.

This prevents the indication from needlessly becoming complicated and prevents a confusion.

As an eleventh aspect of the present invention, based on the ninth aspect, "n" of the n-azimuth form is 8.

Therefore, suitable direction information can be obtained.

As a twelfth aspect of the present invention, based on the ninth aspect, by selecting a desirable azimuth out of the azimuth information a detailed map of an arbitrary area around an institution relative to the selected azimuth or of a neighboring area is displayed. As a thirteenth aspect of the present invention, based on the twelfth aspect, the selection of the desirable azimuth is carried out by clicking or scrolling the azimuth being displayed.

Therefore, visibility is enhanced by changing indication depth or indication color of the 8-direction line segment, for example, according to the distance to a target institution, further burden-lightening can be attained and the operability can be improved.

As a fourteenth aspect of the present invention, a map information providing system wherein a map information providing server and a terminal unit are connected through a communication line comprises: an arithmetic portion for calculating azimuth information consisting of a direction and a distance to an institution from an arbitrary position as a central position after the institution or its related information is inputted from the terminal unit and for specifying a surrounding area to be displayed on the terminal unit; and a display information generation portion for displaying map information of the surrounding area and the azimuth information on the terminal unit, wherein the azimuth information includes information showing a distance to the institution from a predetermined position on the map information transmitted to, and displayed on, the terminal unit.

With the above structure, the distance and the direction, along with the map information, to the institution can be displayed by means of the azimuth information generation portion. Therefore, recognition of information of the surrounding area to a destination is facilitated, and a useless scrolling operation can be omitted at the terminal unit with a small display capacity, thereby lightening the user's burden of the recognition.

As a fifteenth aspect of the present invention, based on the fourteenth aspect, the azimuth information is a line segment symbol having a plurality of line segments arranged radially at regular angle-intervals, and the arithmetic portion generates a line segment having a length corresponding to the distance. As a sixteenth aspect of the present invention, based on the fourteenth aspect, the azimuth information is a line segment symbol having a plurality of line segments arranged radially at regular angle-intervals, and the arithmetic portion generates a line segment having a indication depth corresponding to the distance. As a seventeenth aspect of the present invention, based on the fourteenth aspect, the azimuth information is a line segment symbol having a plurality of line segments arranged radially at regular angle-intervals, and the arithmetic portion generates a line segment having an indication color corresponding to the distance. As an eighteenth aspect of the present invention, based on any one of the fifteenth to seventeenth aspects, the azimuth information is an arrow symbol having a plurality of arrows arranged radially at regular angle-intervals.

Therefore, when a map is displayed the direction of the nearest institution such as a station is shown by a line segment symbol or an arrow symbol, and the visibility is enhanced by carrying out depth indication or color indication, thereby further lightening the user's burden and improving the operability because of avoiding a useless scrolling operation.

As a nineteenth aspect of the present invention, a computer readable recording medium used for a map information providing system wherein a map information providing server and a terminal unit are connected through a communication line comprises the programed and recorded steps of: inputting an institution or its related information from the terminal unit and; calculating azimuth information consisting of a direction and a distance to the institution from an arbitrary or present position as a central position and specifying a surrounding area to be displayed on the terminal unit; and displaying map information of the surrounding area and the azimuth information on the terminal unit.

As a twentieth aspect of the present invention, based on the nineteenth aspect, the recording medium further comprises the programed and recorded steps of: retrieving an institution existing within a predetermined distance from the central position; calculating a direction and a distance from the central position to the institution having been retrieved; and transmitting a result of the calculation as azimuth information to the terminal unit. As a twenty first aspect of the present invention, based on the nineteenth aspect, the recording medium further comprises the programed and recorded steps of: generating a line segment symbol or an arrow symbol, as the azimuth information, having a plurality of line segments or arrows, respectively, arranged radially at regular angle-intervals and each having a length corresponding to the distance.

Therefore, recognition of information of the surrounding area to a destination is facilitated, and a useless scrolling operation can be omitted at the terminal unit with a small display capacity, thereby lightening the user's burden of the recognition.

The above and other objects and features of the present invention will become more apparent from the following description taken in conjunction with the accompanying drawings.

DESCRIPTION OF THE PREFERRED EMBODIMENT(S)

An embodiment of the present invention will now be described in further detail with reference to the accompanying drawings.

Figure 1:
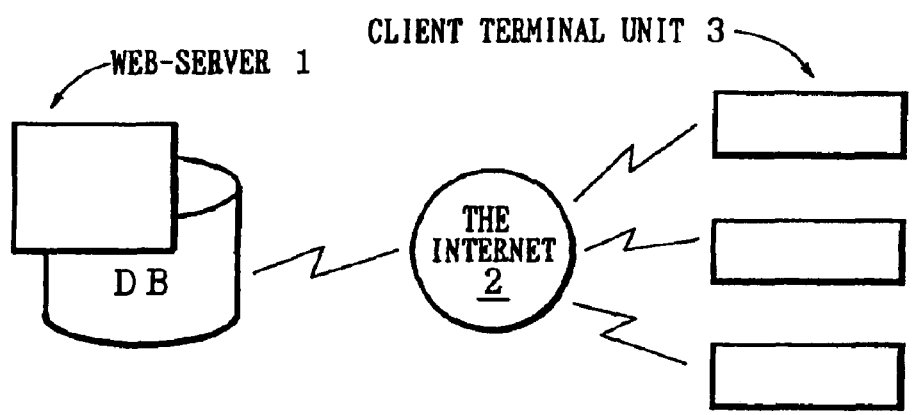
FIG. 1 is a schema showing an embodiment of a map information providing system according to the present invention.

FIG. 1 is a schema showing an embodiment of a map information providing system according to the present invention. In FIG. 1, 1 designates a Web-server, 2 is the Internet, and 3 is a terminal unit having a browser function as a client. In FIG. 1, the terminal unit 3 is a portable telephone. The portable telephone with a relatively small display capacity is connected to the Internet 2 through a non-shown dial-up line network and an access service. And, a map information providing site, a map information database site, and a Web-server 1 being a route setup site are connected to the Internet 2.

The map information providing site makes a providing service of map information by the WWW (World Wide Web) and controls the information supply for the client terminal unit 3 from the map database site and the route setup site. And, this map information providing site, as the Web-server 1, has a database (DB) in which data showing addresses, landmarks such as institutions, and their position information are accumulated. The Web-server 1 identifies an address or an institution from inputted position information by accessing the database on the basis of the information inputted from the client terminal unit 3 and gets position information corresponding to the landmark.

The map database site conducts a retrieval-display service of map information on the Internet and conducts a map service of reading out and transmitting the map data to the client terminal unit 3. The map database site has a map server to read out the map data and to transmit the data to the client terminal unit 3 and a map information database in which position information showing a coordinate of latitude and longitude, map displaying information such as a scale or a map size, and map image data corresponding to the above information are accumulated.

Figure 2:
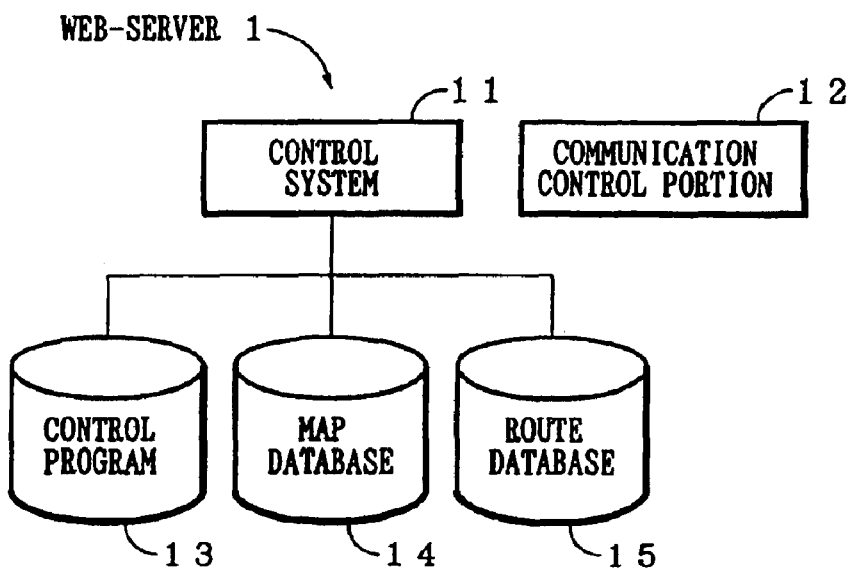
FIG. 2 is a block diagram showing an internal configuration of a Web-server of FIG. 1.
Figure 3:
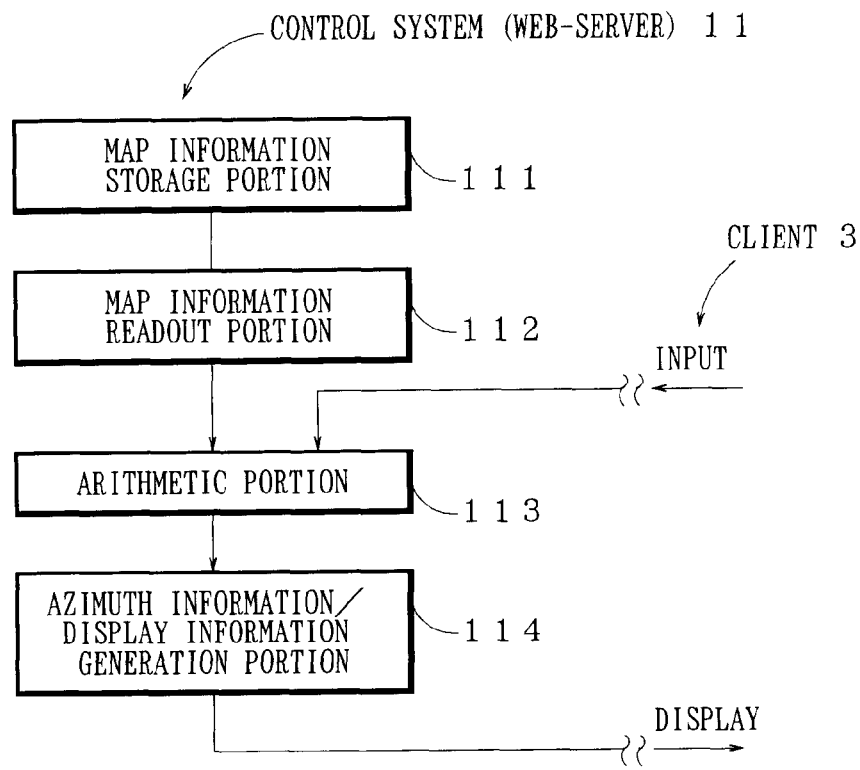
FIG. 3 is a block diagram showing an internal configuration of a control system of FIG. 2.

FIG. 2 is a block diagram showing an internal configuration of a Web-server of FIG. 1. The Web-server consists of a central control system 11, a communication control portion 12, and various databases 13, 14, 15. The control system 11 is a hardware to carry out the control on the basis of the control program stored in the database 13. An internal configuration of the control system 11 is shown in FIG. 3. The communication control portion 12 is a hardware of interface and supports TCP/IP(Transmission Control Protocol/Internet Protocol), for example.

Figure 4:
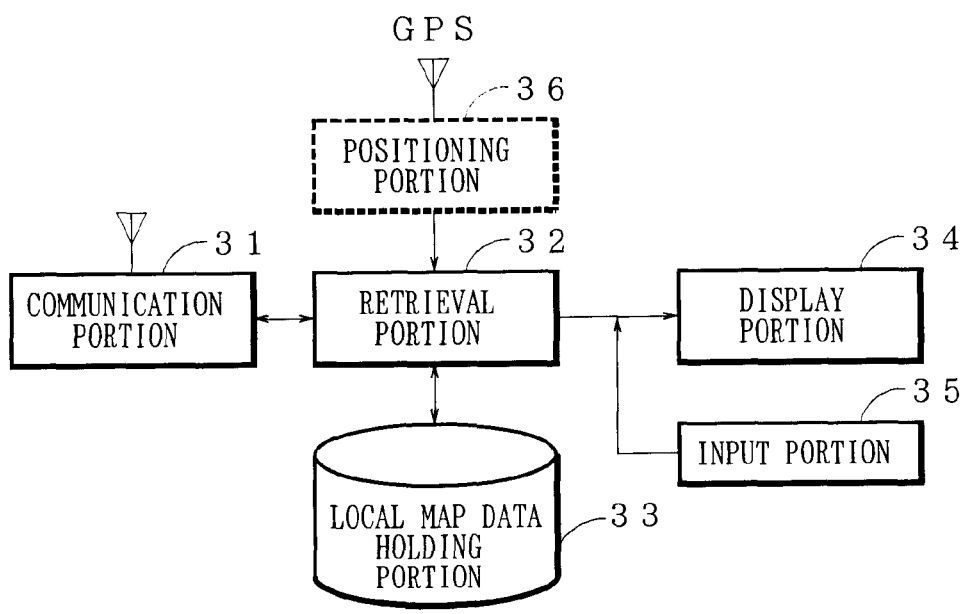
FIG. 4 is a block diagram showing an internal configuration of a client terminal unit of FIG. 1.

FIG. 3 is a block diagram showing an internal configuration of a control system of FIG. 2, and FIG. 4 is a block diagram showing an internal configuration of a client terminal unit of FIG. 1. As is shown in FIG. 3, the control system 11 of the Web-server 1 consists of a map information storage portion 111, a map information readout portion 112, an arithmetic portion 113, and an azimuth information/display information generation portion 114.

The position information and the map information corresponding to the position information are stored in the map information storage portion 111 as a part of the map database 14 taken in by the control system 11 shown in FIG. 2. The map information readout portion 112 reads out a map of a predetermined area from the map information storage portion 111 and functions to display the map, having being read out, on the display portion of a client. In the map information storage portion 111 of the control system 11, institutions with position information are stored. The azimuth information/display information generation portion 114 generates azimuth information which shows a position of an institution when a map of a predetermined area is displayed on the display portion of a client. The azimuth information generated here includes information for recognition of a distance from the predetermined position to the predetermined institution on the displayed map.

As shown in FIG. 4, the client terminal unit 3 consists of a communication portion 31, a retrieval portion 32, a local map data-hold portion 33, a display portion 34, and an input unit 35. And, a GPS (global positioning system) positioning portion 36 is installed as an option. The GPS positioning portion 36 catches the electric wave sent by an artificial satellite, detects position information including the latitude and the longitude, and informs to the retrieval portion 32 and the display portion 34. The local map data-hold portion 33 holds the local map data which have been sent through the control system 11. The retrieval portion 32 retrieves a surrounding map from the map data held in the local map data-hold portion 33 on the basis of the position information informed from the GPS positioning portion 36 and informs the result to the display portion 34.

The display portion 34 displays the position information from the GPS positioning portion 36 and the surrounding map from the retrieval portion 32. The communication portion 31 is a hardware of interface with the Internet 2, receives and transmits the data to be displayed as the surrounding map on the display portion 34. The communication portion 31 transmits the data inputted through the input unit 35 to the Web-server 1 through the Internet 2. The input unit 35 activates an access to a map site by using a pointing device such as a mouse pointer, clicks an area to be displayed on the display portion 34, inputs an institution, and selects the azimuth information.

Figure 8:
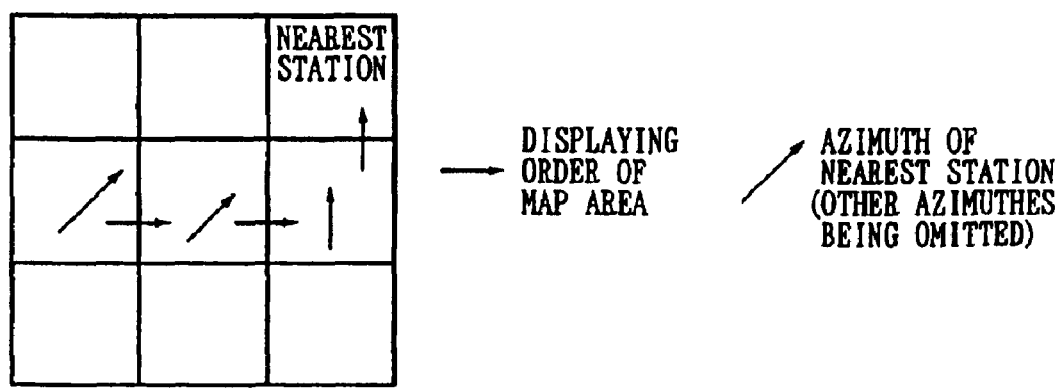
FIG. 8 is a schema showing shifts of the section displayed on the display portion.
Figure 5:
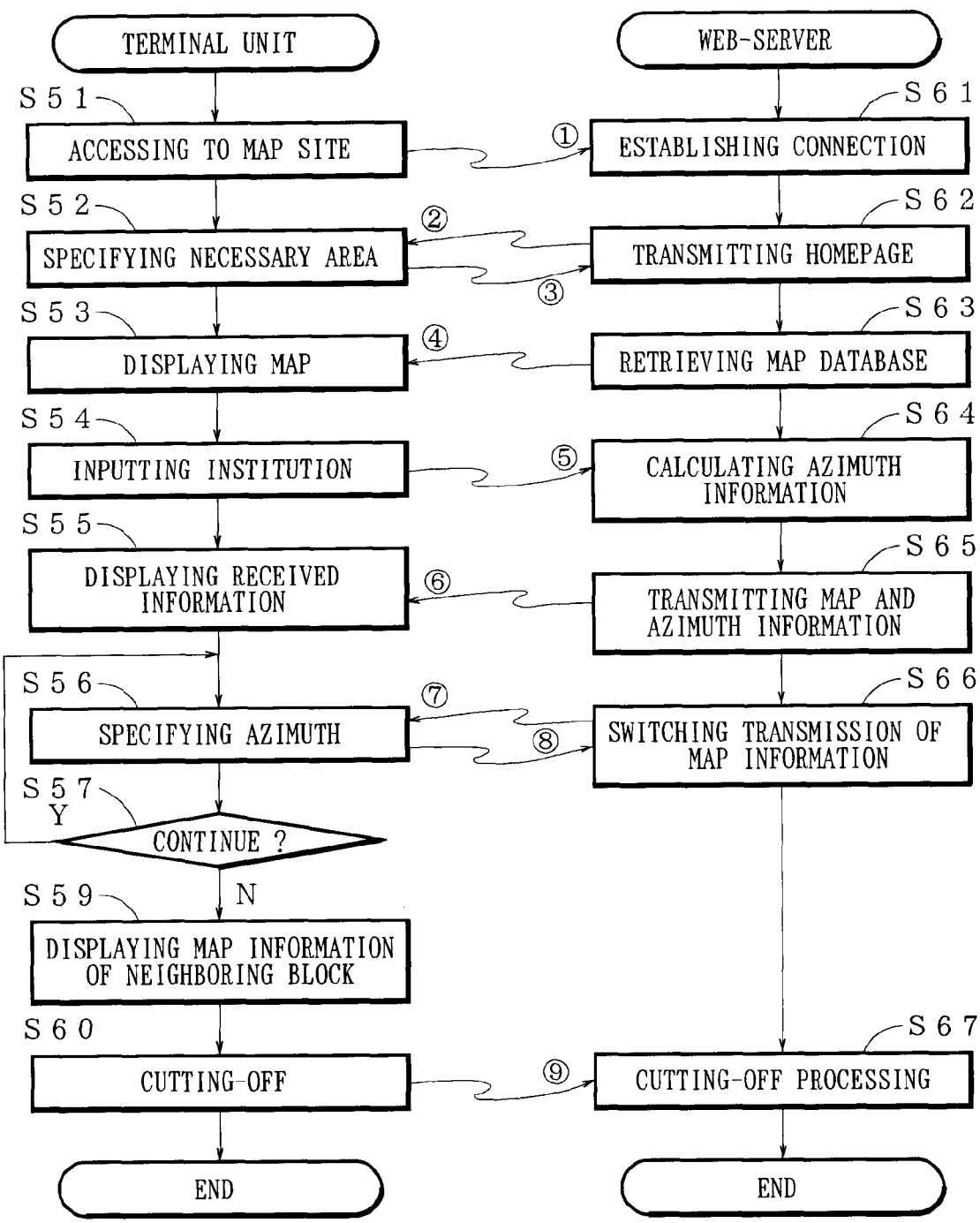
FIG. 5 is a flowchart of the operation of the embodiment of the present invention.
Figure 6:
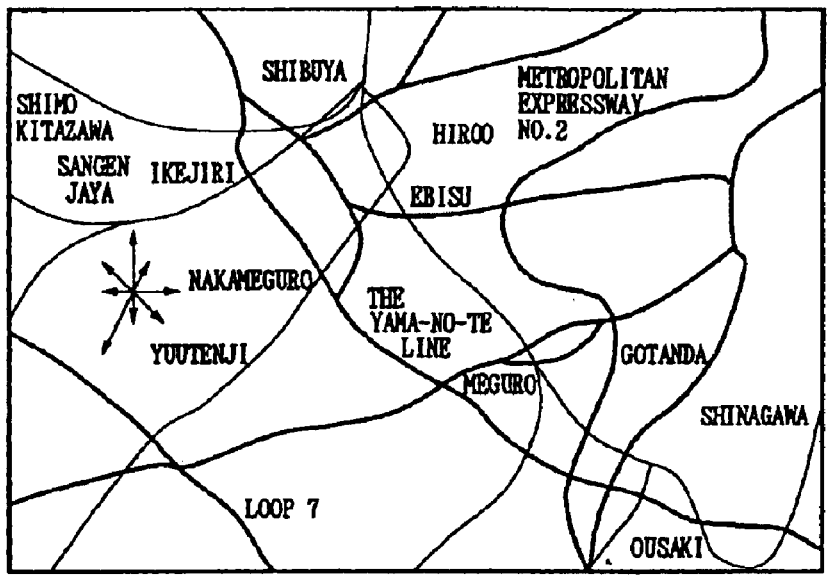
FIG. 6 is a sample of map information displayed on a display portion.

FIGS. 5 to 8 are cited for describing the operation of the present embodiment. FIG. 5 is a flowchart showing a communication protocol between the client terminal unit 3 and the Web-server 1, FIG. 6 is a sample of a map information displayed on the display portion, FIGS. 7A–7C are display forms of line-segment information displayed on the display portion; and FIG. 8 is a schema showing a shift of the section displayed on the display portion.

The operation of the present embodiment shown in FIGS. 1 to 4 will be described in detail with reference to FIGS. 5 to 8. It should be noted that the numbers in circles, as shown in FIG. 5, represent an ordered sequence of events between the client terminal unit 3 and the Web-server 1. First, a map site is accessed (step S51) by the Uniform Resource Locators with the input by using keyswitches of the client terminal unit 3 such as a portable telephone. By this, the Web-server 1 establishes the connection (step S61) and transmits a homepage (step S62) waits for designation of a predetermined area by the client terminal unit 3 (step S52), retrieves the map database 14 (step S63), and displays a map of the predetermined area on the display portion 34 (step S53).

Here, predetermined facilities or institution such as a department store, a convenience store, or public facilities is designated (step S54) by accessing the map site from, for example, a portable telephone through the Internet, or an address, a place name, or a zip code is designated. And, a map, with a predetermined scale, of a predetermined area is displayed on the client terminal unit 3 around the facilities or institution as a central position. Besides, as shown in FIG. 4, a map of a predetermined scale is displayed on the client terminal unit 3 around the present position as the central position by means of the GPS (i.e., the positioning portion 36) of the client terminal unit 3.

Figure 7A:
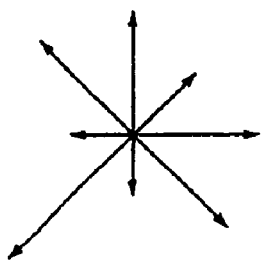
FIGS. 7A–7C are display forms of line-segment information displayed on the display portion.
Figure 7B:
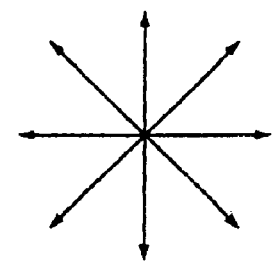
Figure 7C:
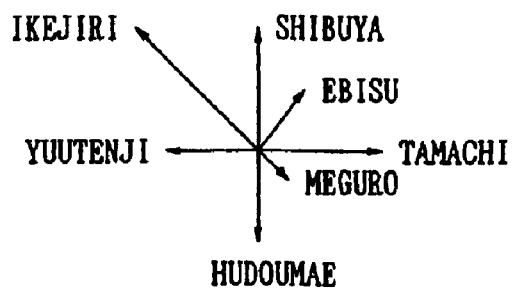

At this time, the Web-server 1 retrieves the position of a station existing within a predetermined distance from the displayed central position (or from a predetermined position such as an intersection of main roads) out of the map database 14. And, the control system 11 of the Web-server 1 calculates a direction and a distance between the central position and the station (step S64) as station information by means of the arithmetic portion 113 and the azimuth information generation portion 114 and gives the station information to the client terminal unit 3 (step S65). The client terminal unit 3 displays the station information (step S55). As shown in FIG. 7A, the station information is shown with an 8-azimuth form wherein the length of line segment (of straight line or arrow) is set according to the distance. And, as shown in FIG. 7B, the indication depth of the line segment with the same length may correspond to the distance. And, the indication color of the line segment with the same length may correspond to the distance. Visibility for recognition is improved by showing a station name near each line segment as shown in FIG. 7G. Here, the line segment is not shown when the distance from the central position to the station is not less than the predetermined value for preventing the display from becoming complicated. FIG. 6 is a sample of map information displayed on the display portion 34 of the client terminal unit 3.

The azimuth information is made at the map site side, i.e., at the Web-server 1, and sent to the client terminal 3. And, an operator of a portable telephone specifies an azimuth while taking a look at this azimuth information (step S56), and the specified information is sent to the map site. And, a map of the specified azimuth is given to the client terminal unit 3 from the map database 14 (step S66), and the client terminal unit 3 displays this map on the display portion 34. Step S60 and step S67 relate to disconnection. At this time, as shown in FIG. 8, the map around the station may be immediately displayed, and then maps of neighboring areas may be displayed in turn. An azimuth is designated by clicking an azimuth line segment with a pointing cursor or by pushing scroll keys (which may be used as those having another function) provided on the client terminal 3. The map information of a neighboring block is displayed by iterating the above process times (steps S56–S58).

As stated above, in the map information retrieval service system using the Internet, the present invention facilitates to recognize the surrounding area by displaying a direction of facilities or institution including, for example, a station on a map shown on a display of a unit of a user and lightens the burden of a user by facilitating the recognition by means of the 8-direction arrows with different indication depth or color corresponding to the distance, thereby improving the operability.

Here, in the above embodiment, facilities, institution, or its related information is inputted from the terminal unit, the Web-server 1 calculates the above azimuth information consisting of the distance and the direction from an arbitrary position to the facilities or institution and decides the surrounding area to be displayed on the terminal unit, and the map of the surrounding area along with the above azimuth information is transmitted to the above terminal unit. However, the similar control may be carried out by downloading a corresponding program from the control system 11 by the terminal unit functioning as the browser. And, though only a portable telephone is used as the terminal unit functioning as the browser, personal digital assistants, a personal computer, and a vehicle-mounted navigation may also be used. And, the present invention can be applied to a closed system other than the communication network using the Internet by using the CD-ROM, the DVD, and the like. And, though the procedure shown by a flow-chart in FIG. 5 is programmed in the Web-server and the terminal unit, is recorded in a recording medium such as an optical disk, a hard disk, or a floppy disk usually, and is read out and executed by the CPU. Or especially, the program in the terminal unit may be downloaded through the communication line, instead of fixing it in a recording medium.

As stated above, in the present invention, the terminal unit having the browser, such as a portable telephone including the display monitor, accesses the map information site through the network communication circuit such as the Internet. And, an institution such as a station, or otherwise its related information such as an address or a zip code, is inputted. The azimuth information consisting of a direction and a distance to the above institution from an arbitrary position or the present position is calculated. And, the surrounding area to be displayed is decided, and a map of the surrounding area along with the azimuth information is displayed.

Therefore, recognition of information of the surrounding area to a destination is facilitated, and a useless scrolling operation can be omitted at the terminal unit with a small display capacity, thereby lightening the user's burden of the recognition.

And, when a map is displayed around the destination or the target place, the direction of the nearest institution such as a station is shown by a line segment symbol or an arrow, and the visibility is enhanced by carrying out depth indication or color indication, thereby further lightening the user's burden and improving the operability because of avoiding a useless scrolling operation.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein. Incidentally, the contents of Japanese Patent Application No. 2001-071145 are hereby incorporated by reference.

What is claimed is:

1. A map information providing method used for a map information providing system wherein a map information providing server and a terminal unit are connected through a communication line, comprising:

inputting an institution or its related information from the terminal unit;

calculating, at the map information providing server, azimuth information consisting of a direction and a distance to the institution from an arbitrary position as a central position;

specifying, at the map information providing server, a surrounding area of the central position to be displayed on the terminal unit; and displaying map information of the surrounding area and the azimuth information on the terminal unit, wherein the arbitrary position is the center of the displayed map.

2. A map information providing method used for a map information providing system wherein a map information providing server and a terminal unit are connected through a communication line, comprising the steps of:

inputting an institution or its related information from the terminal unit;

calculating, at the map information providing server, azimuth information consisting of a direction and a distance to the institution from a present position as a central position;

specifying, at the map information providing server, a surrounding area of the central position to be displayed on the terminal unit; and displaying map information of the surrounding area and the azimuth information on the terminal unit, wherein the present position is the center of the displayed map.

3. The information providing method as set forth in claim 1 or claim 2, wherein the institution is a station being a public institution.

4. The information providing method as set forth in claim 1 or claim 2, wherein the related information is at least one of an address, a place name, and a zip code.

5. The information providing method as set forth in claim 1 or claim 2, further comprising:

retrieving, at the map information providing server, a second institution existing within a predetermined distance from the central position;

calculating, at the map information providing server, a direction and a distance from the central position to the second institution having been retrieved; and transmitting, from the map information providing server, a result of the calculation as second azimuth information to the terminal unit.

6. The information providing method as set forth in claim 5, wherein the second azimuth information is designated by a n-azimuth form, wherein length of a line segment indicating an azimuth varies according to a distance.

7. The information providing method as set forth in claim 5, wherein the second azimuth information is designated by a n-azimuth form wherein the thickness of a line segment indicating an azimuth varies according to a distance.

8. The information providing method as set forth in claim 5, wherein the second azimuth information is designated by a n-azimuth form wherein color of a line segment indicating an azimuth varies according to a distance.

9. The information providing method as set forth in claim 6, wherein a name of the institution is shown near the line segment.

10. The information providing method as set forth in claim 9, wherein the corresponding line segment of the n-azimuth form is not shown when the distance from the central position to the second institution exceeds the predetermined distance.

11. The information providing method as set forth in claim 9, wherein "n" of the n-azimuth form is 8.

12. The information providing method as set forth in claim 9, wherein by selecting a desirable azimuth out of the second azimuth information a detailed map of an arbitrary area around the second institution relative to the selected azimuth or of a neighboring area is displayed.

13. The information providing method as set forth in claim 12, wherein the selection of the desirable azimuth is carried out by one of clicking and scrolling the azimuth being displayed.

14. A map information providing system wherein a map information providing server and a terminal unit are connected through a communication line, comprising:

an arithmetic portion, of the map information providing server, for calculating azimuth information consisting of a direction and a distance to an institution from an arbitrary position as a central position after the institution or its related information is inputted from the terminal unit and for specifying a surrounding area to be displayed on the terminal unit; and a display information generation portion of the map information providing server for displaying map information of the surrounding area and the azimuth information on the terminal unit, wherein the azimuth information includes information showing a distance to the institution from the central position on the map information transmitted to, and displayed on, the terminal unit.

15. The map information providing system as set forth in claim 14, wherein the azimuth information is a line segment symbol having a plurality of line segments arranged radially at regular angle-intervals, and the arithmetic portion generates a line segment having a length corresponding to the distance.

16. The map information providing system as set forth in claim 14, wherein the azimuth information is a line segment symbol having a plurality of line segments arranged radially at regular angle-intervals, and the arithmetic portion generates a line segment having a thickness corresponding to the distance.

17. The map information providing system as set forth in claim 14, wherein the azimuth information is a line segment symbol having a plurality of line segments arranged radially at regular angle-intervals, and the arithmetic portion generates a line segment having an indication color corresponding to the distance.

18. The map information providing system as set forth in any one of claims 15 to 17, wherein the azimuth information is an arrow symbol having a plurality of arrows arranged radially at regular angle-intervals.

19. A computer readable recording medium used for a map information providing system wherein a map information providing server and a terminal unit are connected through a communication line, comprising the programmed and recorded steps of:

inputting an institution or its related information from the terminal unit; and calculating, at the map information providing server, azimuth information consisting of a direction and a distance to the institution from an arbitrary or present position as a central position and specifying, at the map information providing server, a surrounding area of the central position to be displayed on the terminal unit; and displaying map information of the surrounding area and the azimuth information on the terminal unit, wherein the central position is the center of the displayed map.

20. The recording medium as set forth in claim 19, further comprising the programmed and recorded steps of:

retrieving a second institution, at the map information providing server, existing within a predetermined distance from the central position;

calculating, at the map information providing server, a direction and a distance from the central position to the second institution having been retrieved; and transmitting, from the map information providing server, a result of the calculation as second azimuth information to the terminal unit.

21. The recording medium as set forth in claim 19, further comprising the programmed and recorded steps of:

generating a line segment symbol or an arrow symbol, as the second azimuth information, having a plurality of line segments or arrows, respectively, arranged radially at regular angle-intervals and each having a length corresponding to the distance.

* * * * *